United States Patent
Prabhu et al.

(10) Patent No.: US 10,887,354 B2
(45) Date of Patent: Jan. 5, 2021

(54) MEDIA OPTIMIZATION OF BROWSER-BASED REAL-TIME COMMUNICATIONS APPLICATIONS IN A VIRTUAL DESKTOP ENVIRONMENT

(71) Applicant: VMware, Inc., Palo Alto, CA (US)

(72) Inventors: Sonia Prabhu, Palo Alto, CA (US);
Vertika Singh, Palo Alto, CA (US);
Anurag Katiyar, Palo Alto, CA (US);
Sumeet Vohra, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 264 days.

(21) Appl. No.: 15/982,073

(22) Filed: May 17, 2018

(65) Prior Publication Data
US 2019/0356701 A1    Nov. 21, 2019

(51) Int. Cl.
*G06F 15/167*    (2006.01)
*H04L 29/06*    (2006.01)

(52) U.S. Cl.
CPC .... *H04L 65/1069* (2013.01); *H04L 29/06517* (2013.01); *H04L 65/1073* (2013.01); *H04L 65/4061* (2013.01); *H04L 65/608* (2013.01)

(58) Field of Classification Search
CPC ........... H04L 65/1069; H04L 29/06517; H04L 65/608; H04L 65/1003; H04L 65/60
See application file for complete search history.

(56) References Cited

U.S. PATENT DOCUMENTS

| | | | | |
|---|---|---|---|---|
| 2014/0006977 | A1* | 1/2014 | Adams | H04L 51/32 715/758 |
| 2015/0373057 | A1* | 12/2015 | Ezell | H04L 67/02 709/204 |
| 2016/0294913 | A1* | 10/2016 | Jansson | H04L 67/02 |
| 2019/0155861 | A1* | 5/2019 | Klug | G06F 16/957 |
| 2019/0238599 | A1* | 8/2019 | Ingale | H04L 67/42 |

\* cited by examiner

*Primary Examiner* — Chris Parry
*Assistant Examiner* — Stephen J Houlihan

(57) ABSTRACT

Techniques are described for offloading the encoding and decoding of multimedia content transmitted during a real-time communication (RTC) session from the virtual desktop to the client device so that the multimedia content can be communicated directly between the client device and the remote peer device without the involvement of the virtual desktop. The offload eliminates the additional network hop of the multimedia content to the virtual desktop that is present in conventional virtual desktop environments, thereby reducing network latency and improving performance, CPU utilization and network load on the virtual machine hosting the virtual desktop. In order to offload the multimedia encoding/decoding, the techniques described herein intercept a number of Application Programming Interface (API) calls to override the messages used to establish a multimedia communication session between the RTC application and the remote peer device.

14 Claims, 6 Drawing Sheets

MEDIA OPTIMIZATION OF BROWSER-BASED REAL-TIME COMMUNICATIONS APPLICATIONS IN A VIRTUAL DESKTOP ENVIRONMENT

TECHNICAL FIELD

The present disclosure generally relates to virtual desktop environments and more specifically to techniques for optimizing media transmission by web-based real-time communication applications operating in a web browser on a virtual desktop.

BACKGROUND

Virtual desktops provided as part of a virtual desktop infrastructure (VDI) or desktop-as-a-service (DAAS) offerings have become commonplace in certain enterprise work environments. The security of having a remotely stored desktop, ability to access the desktop from any location and on any device, centralized desktop management, efficient utilization of hardware resources, as well as numerous other benefits made possible by VDI/DAAS make virtual desktops an appealing option to many users and organizations. In a conventional VDI or DAAS environment, each user in an enterprise is provisioned a virtual desktop and the user is allowed to access his or her virtual desktop over a remote network connection, such as a WAN connection. The virtual desktops are typically hosted on servers that physically reside in a data center of the enterprise (or a third-party service provider), and each host server may run multiple virtual desktops. Users can utilize a client device to remotely log into their individual virtual desktop and all of the application execution takes place on the remote host server, while the client device only receives display information (e.g. pixel data) from the remote host server and communicates user input data (e.g. mouse and keyboard events) to the remote host server. Typically, the client device communicates with the remote host server over a network connection using a remote display protocol, such as remote desktop protocol (RDP), PC-over-IP protocol (PCoIP), VMware Blast, virtual network computing (VNC) protocol, or the like. Using the remote desktop protocol, the user can interact with various applications of the virtual desktop, which are actually running on the remote host server, with only the display, keyboard, and mouse information being communicated with the local client device.

While virtual desktop technology offers numerous benefits, it also presents certain challenges, particularly in the context of multimedia transmissions by applications operating on the virtual desktop. One such challenge occurs in real-time communications (RTC) applications which are widely used by users to collaborate and work together. RTC applications, such as those based on the WebRTC framework, communicate multimedia (i.e. audio and/or video) between two participants over the Internet using a standardized set of APIs which enable the applications to provide a rich and high-quality end user experience and allow them to communicate using a common set of protocols.

When an RTC application is executed in a web browser of a virtual desktop, the audio/video content captured on the client device first needs to be sent from the client device to the virtual desktop and only then forwarded from the virtual desktop to the remote peer. This effectively adds an extra "network hop" in the transmission of the multimedia content. Conversely, the multimedia captured on the remote peer also needs to be first delivered to the virtual desktop and only then relayed to the client device. The delay due to these additional network hops is even more prevalent in scenarios where both peers are using virtual desktops, thus doubling the network hops between the two peers. Further compounding the problem, all of the computational work of encoding and decoding the multimedia content is done by the RTC application on the virtual desktop and then repeated again by the desktop remoting protocol to send and receive data to and from the client. Unsurprisingly, this introduces adverse effects on not only the user experience but also hardware utilization, such as the server consolidation ratio due to the increased CPU load, network bandwidth and overall memory consumption of the server. An improved method of multimedia communication is desirable in virtual desktop environments.

DETAILED DESCRIPTION

Figure 1:
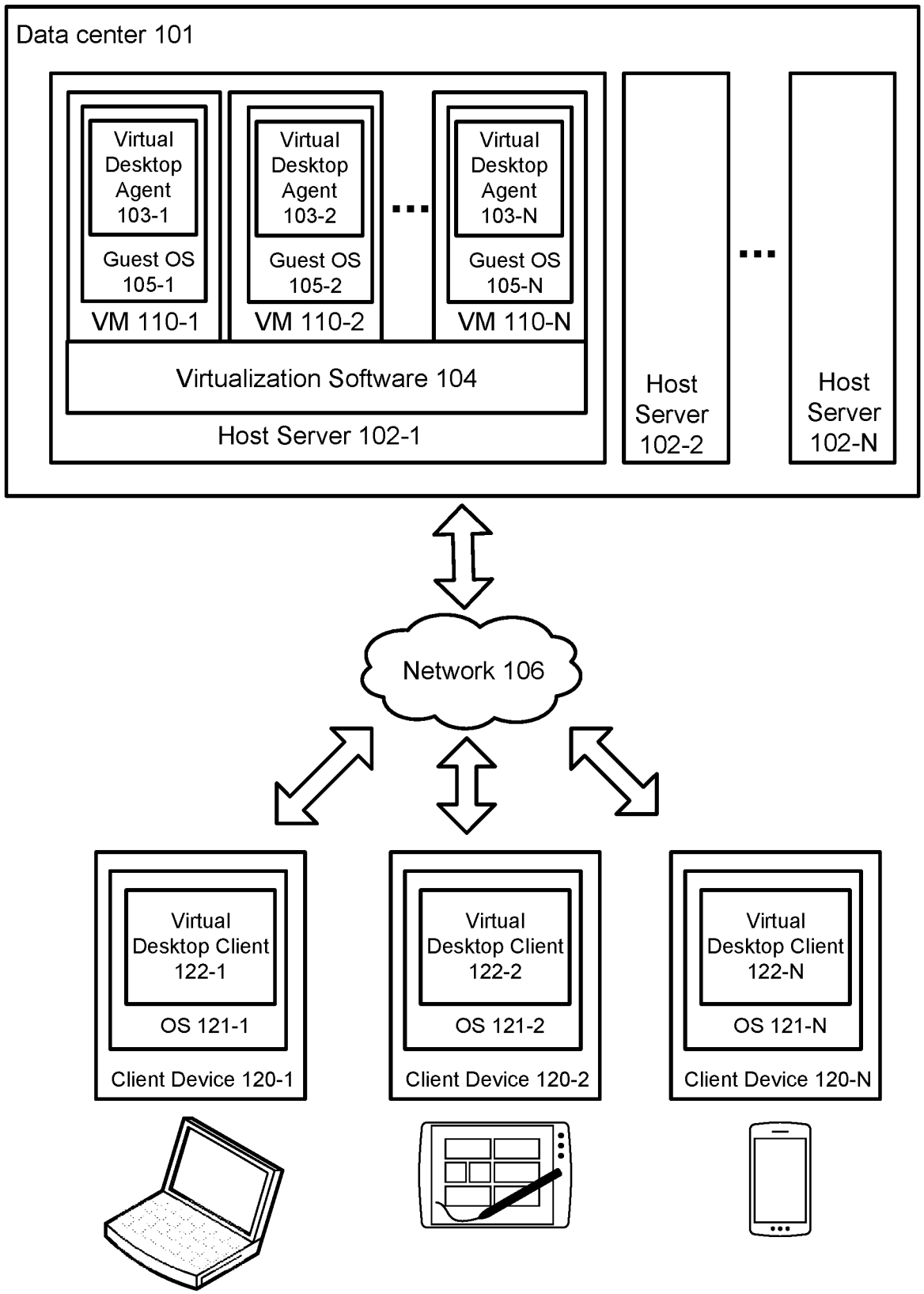
FIG. 1 illustrates an example of a virtual desktop environment, in accordance with various embodiments.

Systems and methods in accordance with various embodiments of the present disclosure overcome at least some of the above-mentioned shortcomings by offloading the encoding and decoding of multimedia content from the virtual desktop to the client device so that the multimedia content can be communicated directly between the client device and the remote peer device without the involvement of the virtual desktop. This eliminates the additional network hop of the multimedia content to the virtual desktop, thereby reducing network latency and improving performance due to the encoding and decoding work being performed on the client device without repeating it on the virtual desktop. It also improves CPU utilization and network load on the virtual machine hosting the virtual desktop, resulting in better server consolidation ratio.

In order to offload the multimedia encoding/decoding, the system described herein intercepts a number of Application Programming Interface (API) calls to override the messages used to first establish a multimedia communication session between the RTC application and the remote peer device. More specifically, when a user connected to their virtual desktop session first launches an RTC application, the RTC application first sends one or more session initiation messages to the remote peer in order to set up a multimedia communication session with the remote peer. This session initiation message is intercepted by a browser extension installed on the web browser of the virtual desktop. The browser extension then overrides the session initiation message by replacing at least a portion of its content with information obtained from the client device. For example, the session initiation message may be an "offer" in accordance with the Session Description Protocol (SDP) and the browser extension may override the SDP offer with information obtained from the client device. In one embodiment, when the web browser extension intercepts the SDP offer initiated by the RTC application, it instead requests an SDP offer from the client device, receives the SDP offer from the client device and then transmits the SDP offer obtained from the client to the remote peer device. In a similar way, the browser extension may override a number of other communications exchanged as part of the session negotiation process, such as messages negotiating Interactive Connectivity Establishment (ICE) candidates, a fingerprint for Datagram Transport Layer Security (DTLS) handshake and information about the capabilities of the client device.

As a result of overriding the messaging, a secured channel is established directly between the client device and the remote peer device and the multimedia content is directly communicated over the secured channel, thereby bypassing network transmission of the multimedia content to the virtual desktop. This removes the unnecessary network hop to the virtual desktop and leverages the client computing capabilities for encoding and decoding the multimedia.

In the following sections of the description, additional details will be provided regarding the different environments in which the embodiments may be implemented, the problem with the current conventional approach, as well as a more detailed explanation of a media optimization solution enabled by the various embodiments.

FIG. 1 illustrates an example of a virtual desktop environment, in accordance with various embodiments. A conventional virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Each virtual desktop illustrated in FIG. 1 conventionally includes one or more web browsers capable of executing real-time communication (RTC) applications. As used throughout this disclosure, an RTC application is any application that supports the real-time or near real-time communication of multimedia content, such as audio and/or video over a network connection. In a preferred embodiment, an RTC application is a WebRTC application.

Overview of WebRTC

One example of a framework that utilizes RTC communication is Web Real-Time Communication (WebRTC). WebRTC provides a standardized set of Application Programming Interfaces (APIs) to enable RTC applications to provide a rich, high-quality end user experience and allow the applications to communicate via a common set of protocols. Conventionally, WebRTC uses the Session Description Protocol (SDP) as the signaling protocol to establish multimedia communication sessions between two peers. Using SDP, network information and session capabilities (e.g. audio/video codecs that are supported by the peers) are exchanged between the two peers. Based on the information received via SDP offer/answer, the negotiation is performed regarding audio/video codecs to be used for sending and receiving multimedia. SDP offer and answer also contain a fingerprint attribute which is used for performing a Datagram Transport Layer Security (DTLS) handshake between the two peers. To establish network connectivity between the two peers, Interactive Connectivity Establishment (ICE) protocol is used by WebRTC. In cases where the client devices are located behind a Network Address Translator (NAT) gateway, the SDP protocol leverages Session Traversal Utilities for NAT (STUN) and Traversal Using Relays Around NAT (TURN) protocol to get the right ICE candidates that can be used to establish connectivity between the peers.

Once the SDP offer and answer are exchanged, WebRTC starts generating several ICE candidates. Finally, the optimal network path, which in most cases is a peer-to-peer (P2P) connection is discovered and used. Once network connectivity is established between the two peers, the DTLS handshake is performed to later establish a Secure Real-Time Protocol (SRTP) channel for the transfer of multimedia content between the peers.

WebRTC in Conventional Virtual Desktop Environments

Figure 2:
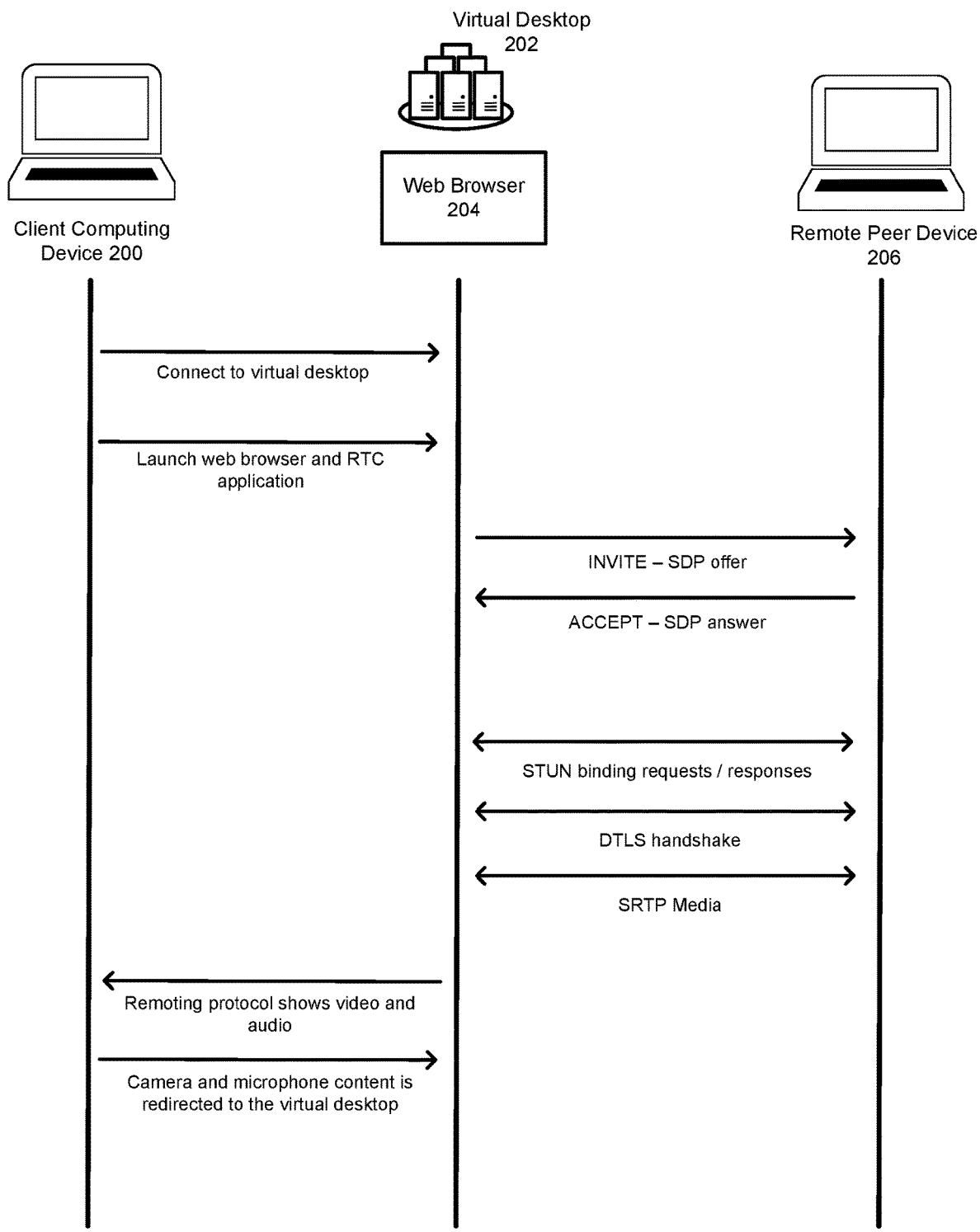
FIG. 2 illustrates an example of a typical process of establishing WebRTC communication by an application operating in a conventional virtual desktop environment.

When WebRTC applications are executed in conventional virtual desktop environments, an additional network hop is introduced during the transmission of multimedia content between the two peers, as previously described. FIG. 2 illustrates an example of a typical process of establishing WebRTC communication by an application operating in a conventional virtual desktop environment.

As shown in this example, when the client device 200 connects to the virtual desktop 202 and tries to establish a WebRTC session, the SDP offer and answer are sent and received by the WebRTC application residing in the web browser 204 of the virtual desktop 202. As a result of this, all of the negotiation regarding the supported video/audio codecs to use and the network path discovery (e.g. STUN binding requests and responses) of the WebRTC framework (previously described) are exchanged between the virtual desktop 202 and the remote peer device 206. Similarly, the DTLS handshake also takes place between the virtual desktop 202 and the remote peer, and the secured channel for transferring the multimedia content (i.e. SRTP channel) is finally established between the virtual desktop 202 and the remote peer device 206.

Because the connection is established between the virtual desktop and the remote peer device, the multimedia content is first delivered to the virtual desktop 202 from the remote peer device 206 through the secured RTP channel. The multimedia content is then decoded by the WebRTC on the virtual desktop and then again encoded by the remoting protocol of the virtual desktop (e.g. PCoIP, etc.) to be delivered as part of the virtual desktop interface to the client device 200. Similarly, the remoting protocol of the virtual desktop typically provides microphone and camera re-direction features which are first used to encode and deliver multimedia captured on the client device 200 to the virtual desktop 202, where the multimedia is decoded using the virtual desktop remoting protocol and then consumed by the WebRTC application. The WebRTC application then re-encodes the decoded video/audio and sends the multimedia content over the secured RTP channel to the remote peer device 206. The remote peer device 206 then decodes the multimedia and displays it to the end user.

As evident from the description above, this design introduces network latency in the virtual desktop environment and fails to leverage the capabilities of the client device, thereby placing a significant CPU load on the virtual desktop. Consequently, the end user experience is negatively impacted and a substantial load is placed on the resources of the server running the virtual desktop.

It should be noted that in the conventional virtual desktop environment, the client device may not be able to reach the remote peer device but the client device does need to be able to reach the virtual desktop and the virtual desktop needs to be able to reach the remote peer in order for the RTC communication to work.

Figure 3:
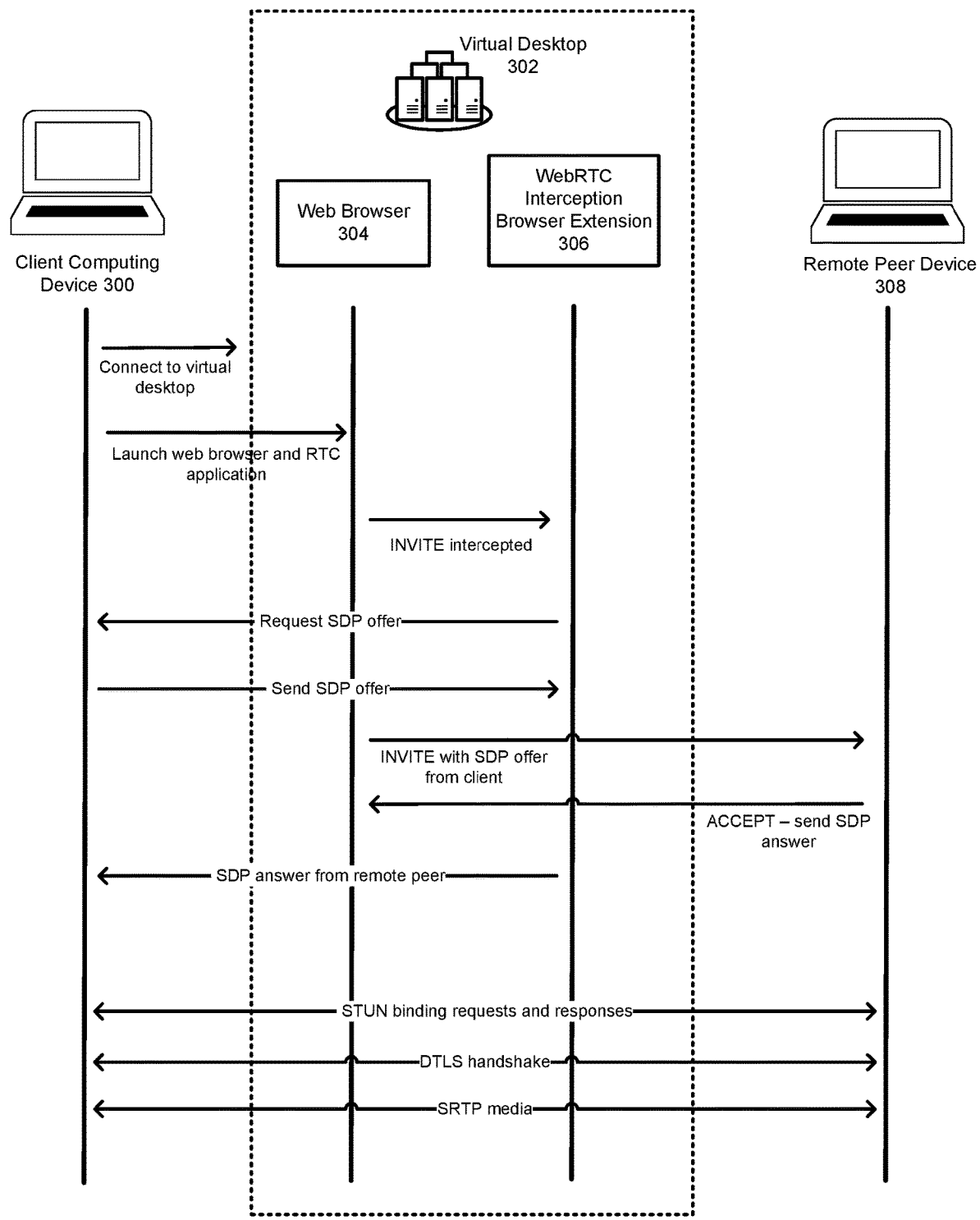
FIG. 3 illustrates an example of media optimization in a real-time communication application operating in a virtual desktop environment, in accordance with various embodiments.

FIG. 3 illustrates an example of media optimization in a real-time communication application operating in a virtual desktop environment, in accordance with various embodiments. The illustration shown in FIG. 3 removes the unnecessary network hop and leverages the capabilities of the client computing device for encoding and decoding the multimedia content.

As illustrated in FIG. 3, a WebRTC Interception Browser Extension 306 is added to the web browser 304 on the virtual desktop 302. When the client device 300 first connects to the virtual desktop 302 and launches the WebRTC application inside the web browser 304, the WebRTC application calls the WebRTC framework of the browser to get the SDP offer (e.g. INVITE message) intended to establish a communication session with the remote peer. In the illustrated embodiment, the session initiation message is intercepted by the WebRTC Intercept Browser Extension 306. The WebRTC Interception Browser Extension 306 then requests an SDP offer from the client device 300. When the Browser Extension 306 receives the SDP offer from the client device 306, it then sends the session initiation message, including the SDP offer obtained from the client device 300 to the WebRTC application which then sends it to the remote peer device 308. For example, the Browser Extension 306 overrides the original SDP offer/answer with the ICE candidates, fingerprint for DTLS handshake and capabilities obtained from the client device 300. Thus, rather than receiving an SDP offer generated by the WebRTC framework of the web browser 304 of the virtual desktop 302, the remote peer device 308 instead receives an SDP offer with information that was generated by the client device 300. The Browser Extension 306 thus overrides the original session initiation message generated by the WebRTC framework by replacing a portion (or all) of the content in the session initiation message with information obtained from the client device 300. In the same way, any additional messaging that may need to be exchanged to establish the multimedia communication session can be overridden by the Browser Extension 306. For example, the WebRTC framework may receive an ACCEPT message containing the SDP answer from the remote peer and this gets intercepted by the Browser Extension 306 and forwarded to the client device 300. As a result of overriding the messaging in this manner, the network connectivity checks using STUN binding requests and responses and the DTLS handshake take place between the client device 300 and the remote peer device 308, thereby skipping the network hop to the virtual desktop 302. Similarly, the secured RTP (SRTP) channel is also setup between the client device 300 and the remote peer device 308 and the multimedia content flows directly between them over this channel.

Notably, in contrast to the conventional virtual desktop environment, the embodiment illustrated in FIG. 3 requires that the client device should be able to reach the both the remote peer and the virtual desktop. Similarly, the remote peer should be able to reach the client device and the virtual desktop. For example, if the user tries to launch a browser application on the client device (no virtual desktop setup) and makes a call to the remote peer, then this call should not fail due to network connectivity issues.

Figure 4:
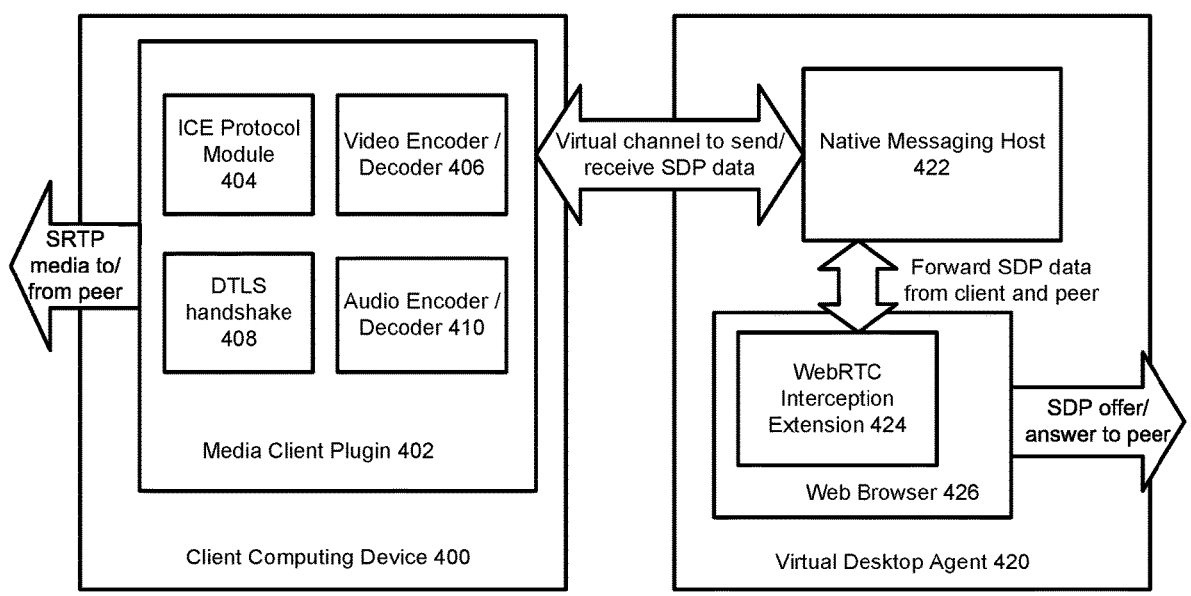
FIG. 4 illustrates an example of possible components that may be utilized to enable the multimedia optimization of RTC applications in the virtual desktop environment, in accordance with various embodiments.

FIG. 4 illustrates an example of possible components that may be utilized to enable the multimedia optimization of RTC applications in the virtual desktop environment, in accordance with various embodiments. As illustrated, the example implementation on the virtual desktop agent 420 includes a WebRTC Interception Extension 424 operating in the web browser 426, and a Native Messaging Host 422 application. The WebRTC Interception Extension 424 intercepts WebRTC APIs to override the SDP offer/answer and ICE candidates. The Native Messaging Host 422 application communicates messages to and from the client device 400. The illustrated implementation on the client device 400 comprises a Media Client Plugin 402 which includes a Video Encoder/Decoder 406, Audio Encoder/Decoder 408, DTLS Handshake module 408 and the ICE protocol module 404. The Media Client Plugin 402 handles the processes of SDP offer/answer creation, audio/video encoding and decoding, generation of ice candidates and the DTLS handshake. This Media Client Plugin 402 communicates with the Native Messaging Host 422 application running on the virtual desktop using TCP channels.

WebRTC Interception Extension 424

In various embodiments, a typical WebRTC application (e.g. video chat application) is able to perform at least three main tasks: (1) acquire audio and video; (2) communicate audio and video; and (3) communicate arbitrary data. There are 3 main WebRTC APIs used to accomplish these tasks:

1. MediaStream (a.k.a. getUserStream)—to get access to the audio/video data.
2. RTCPeerConnection—to communicate audio/video data to the peer device.
3. RTCDataChannel—to communicate data to the peer.

In one embodiment, the WebRTC Interception Extension 424 intercepts the RTCPeerConnection APIs to establish the communication channels between the client device 400 and the remote peer device, thereby eliminating the hop to the virtual desktop. This interception can be accomplished by running a scripting layer as a browser extension implemented in JavaScript. The WebRTC Interception Extension 424 comprises a content script which runs in the context of the webpage. The content script is injected at document start which is the earliest when it is possible to load an extension to override any page elements. The necessary functions of the RTCPeerConnection interface are overridden to be able to override the SDP offer and answer in the virtual desktop with that of the client device 400. In one embodiment, the following are the details of some of the essential functions and objects that are overridden:

webkitRTCPeerConnection.createOffer—This call creates the local SDP offer and sets it to the object localDescription. This call is overridden to return the client device's SDP offer from its callback function/promise object.

webkitRTCPeerConnection.createAnswer—This call creates the SDP answer in response to the SDP offer from the remote peer device. This call is overridden to return the client device's SDP answer instead of the virtual desktop's SDP offer from the callback function/promise object.

webkitRTCPeerConnection.setLocalDescription—This call sets the object localDescription once local SDP offer/answer is created. This is overridden so that localDescription object is set to client device's SDP offer/answer instead of SDP offer from the virtual desktop.

webkitRTCPeerConnection.localDescription—This object's setter and getter functions are overridden to set/get client's SDP offer/answer.

webRTCPeerConnection.onicecandidate and its listener callback—The setter and getter functions of the event onicecandidate are intercepted. In the setter function, an event listener is added to a callback defined by the implementation. This provides a callback whenever this event is set, and an ICE candidate is available. The properties of the ICE candidate can then be changed to reflect the ICE candidate supplied by the client device.

webRTCPeerConnection.iceGatheringState—This is overridden to set the ICE gathering state to complete after supplying all the ICE candidates from the client device.

Native Messaging Host Application 422

The WebRTC Interception Extension 424 sends and receives the SDP offer and answer to the client device 400 with the help of Native Messaging Host 422 application, which runs as a process on the virtual desktop. By way of example, this application can be implemented in C++ and use the Google Chrome web browser's native messaging protocol to communicate with the extension.

In one embodiment, the Native Messaging Host 422 application communicates with the WebRTC Interception Extension 424 on the web browser via standard streams, including standard input stream (STDIN) and standard output stream (STDOUT). It can also leverage the Windows Sockets API (Winsock) provided by the Microsoft Corporation in order to send and receive messages to the Media Client Plugin 402 on the client device 400 over the TCP connection. In one embodiment, the Native Messaging Host 422 application uses the same format to send messages to both the Media Client Plugin 402 and the WebRTC Interception Extension 424: each message is serialized using JSON, UTF-8 encoded and is preceded with 32-bit message length in native byte order.

Media Client Plugin 402

The Media Client Plugin 402 is a process that runs on the machine where the virtual desktop client application is installed and has access to the digital camera and audio capture devices equipped on the machine. The Media Client Plugin 402 is also responsible for exchanging SDP offer and answer from the client device to the Native Messaging Host 422 application on the virtual desktop. It uses TCP connection to communicate SDP messages with the Native Messaging Host 422.

In one embodiment, for handling the audio/video call functionality with the remote peer device, the Media Client Plugin 402 may utilize a media engine that is a fully functional, standalone SIP based voice and video COM dynamic-link library (DLL). One example of such a media engine is the Media Engine included in the Horizon View product offered by VMware, Inc., however other media engines may easily be utilized instead. In various embodiments, the media engine provides functionality, such as SIP registration and proxy support; network interface management and initialization which includes gathering ICE candidates and handling STUN/TURN binding requests and responses; DTLS handshake; audio/video processing including capturing, encoding, RTP handling, jitter handling, decoding and rendering; and sending media over a secured RTP channel.

In various embodiments, the Media Client Plugin's 402 implementation may call the media engine's interfaces and a number of modifications may be made to those interfaces in order to handle WebRTC calls. Since WebRTC is agnostic to the signaling methods and the RTC application is responsible for handling the transport, the media engine may need to be modified to remove the signaling.

In one embodiment, Media Engine sends and receives the SDP data from the remote peer through SIP messaging and passes this data onto the SipCore class. In one implementation where the WebRTC application handles signaling, the SIP messaging layer may be removed and the following changes are made so that the SDP data can be extracted/injected to the Media Engine:

Create COM dispatch event ISipCoreSignalingEvent and OnTransmitRequest callback that the SipCore class invokes whenever the SDP data is available.

Create a method CreateNewWebrtcIncomingCall to the Calls object, which takes in the SDP data and passes it onto the SipCore class which initializes the media engine's state machine appropriately.

The flow of the interaction of the Media Client Plugin 402 with the Media Engine can be as follows:
1. Create Media Engine COM instance.
2. Call Initialize interface of Media Engine.
3. Register for network changes and wait until we receive a notification from the Media Engine that the network is active.
4. Create a window to display video and pass its handle to the Media Engine using MediaControls interface. Also set the media devices using the same interface.
5. Once a request is received for the SDP offer from the Native Messaging Host 422, a new Calls object is created using CreateNewCall interface and the Media Client Plugin 402 waits for the Media Engine to create the SDP offer.
6. Once the SDP offer is ready, Media Engine invokes OnTransmitRequest callback of ISipCoreSignalingEvent where the SDP offer is transmitted to the Native Messaging Host 422.
7. Once the SDP answer from the remote peer is received via the Native Messaging Host 422, the Media Client Plugin 402 invokes CreateNewWebrtcIncomingCall method of Calls object, which passes on the SDP answer to the Media Engine.
8. Similarly, on receiving the SDP offer from the Native Messaging Host 422, the Media Client Plugin 402 invokes CreateNewWebrtcIncomingCall to pass the SDP offer to the Media Engine and waits for the SDP answer. Once the SDP answer is ready, Media Engine calls OnTransmitRequest callback which transmits the SDP answer to the Native Messaging Host 422.

Once the SDP offer/answer has been passed onto the Media Engine, Media Engine starts connectivity checks for the ICE candidates of the remote peer by sending STUN binding requests to it. Once a valid STUN response is received from both endpoints, network connectivity is established and then DTLS handshake is performed between them. The DTLS handshake is mainly done to authenticate the remote peer device by exchanging the certificate and matching them with the fingerprint provided in the SDP data. This certificate will also be used later to send the media over the secured channel.

In one embodiment, the Media Client Plugin 402 performs its interactions with the Native Messaging Host 422 on a different networking thread. This thread may use the Windows Socket API's to send and receive messages from the Native Messaging Host 422. This also sets Windows events to notify Media Client Plugin's 402 main thread of the incoming message. In one embodiment, the Native Messaging Host 422 first sends the command packet "offer" or "answer". Then it sends a second packet that contains the SDP data. In case of offer command, the Media Client Plugin 402 waits for the incoming SDP offer, sends it to the Media Engine and then sends the SDP answer from the Media Engine using the networking thread. For the answer command, Media Client Plugin 402 extracts the SDP offer from the Media Engine, sends the data to the Native Messaging Host 422 and waits for the SDP answer which is then sent to the Media Engine.

It should be noted that the various APIs and changes to those APIs mentioned above are described purely as examples for purposes of illustration. It will be evident to a person having ordinary skill in the art that other implementations using different APIs and different messages are possible and within the scope of the various embodiments described herein.

Figure 5:
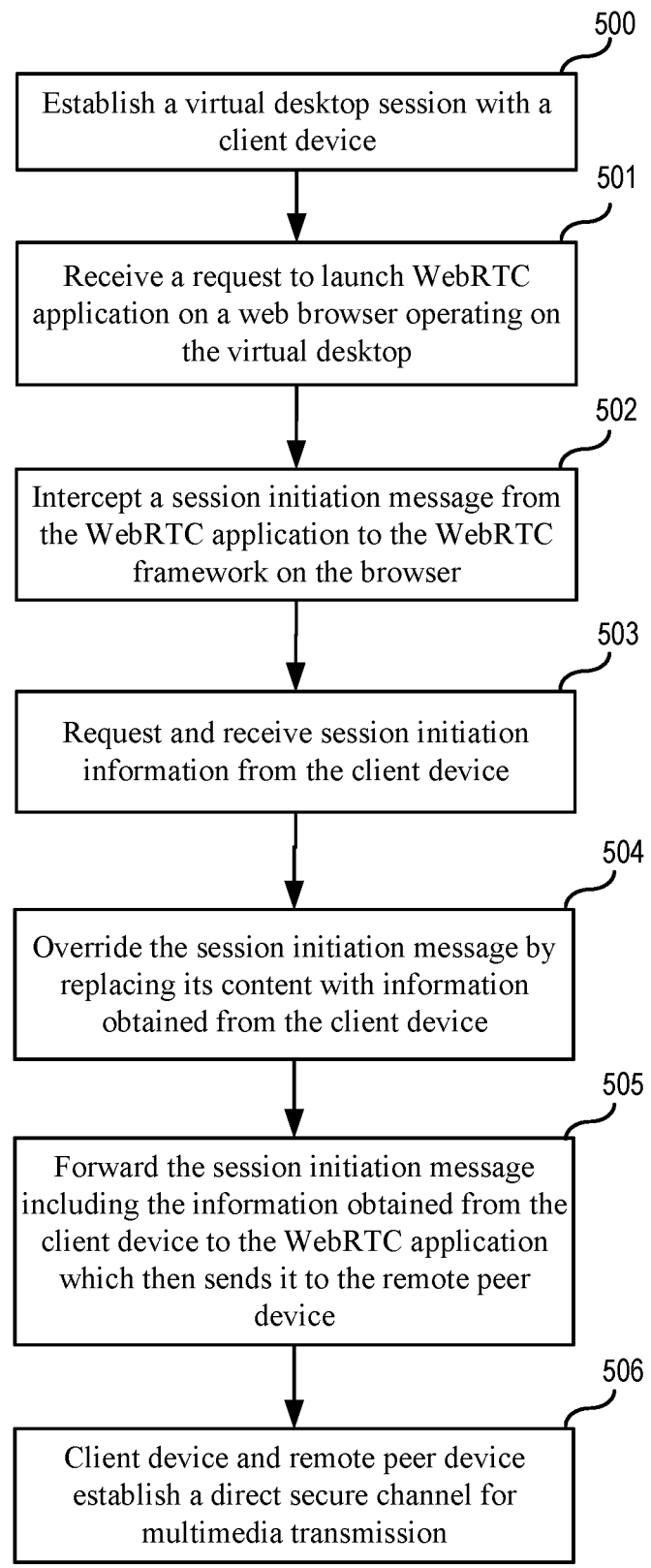
FIG. 5 illustrates an example of a process for optimizing multimedia transmission by an RTC application in a virtual desktop environment, in accordance with various embodiments.

FIG. 5 illustrates an example of a process for optimizing multimedia transmission by an RTC applications in a virtual desktop environment, in accordance with various embodiments. As shown in operation 500, the client device first establishes a connection with the virtual desktop. In operation 501, a request is received from the client device to launch a WebRTC application in the web browser on the virtual desktop. When the WebRTC application is launched, it first tries to establish a communication session with the remote peer device by sending a session initiation message. In operation 502, this session initiation message request from the WebRTC application is intercepted by a web browser extension operating on the web browser. In operation 503, the browser extension requests session initiation information from the client device. For example, the browser extension may request an SDP offer from the client device. In operation 504, the browser extension overrides the session initiation message by replacing a portion or all of its content with information received from the client device. In operation 505, the browser extension forwards the session initiation message, including the information obtained from the client device to the RTC application on the virtual desktop which then sends it to the remote peer device. Similarly, any other messaging used to establish the multimedia communication session may be overridden by the browser extension. As a result of intercepting the API calls and overriding the messaging, a direct secured RTP connection is established between the client device and the remote peer device, thereby bypassing the network hop of the multimedia content to the virtual desktop.

Figure 6:
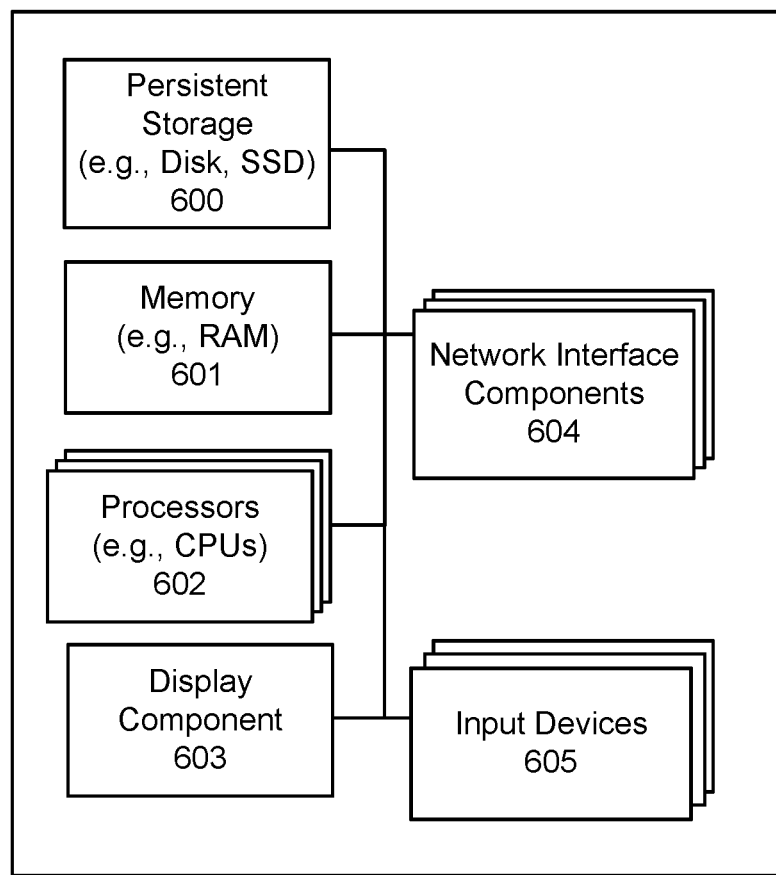
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for optimizing web-based real-time communication applications in a virtual desktop environment, the method comprising:
establishing a virtual desktop session between a client device and a virtual desktop hosted on a server over a network connection;
receiving a request to launch a web real-time communication (WebRTC) application on a web browser operating on the virtual desktop, wherein the WebRTC application is configured to communicate multimedia data with a remote peer device;

intercepting a session initiation message sent from the WebRTC application;

overriding the session initiation message by replacing at least a portion of content of the session initiation message with information obtained from the client device; and forwarding the session initiation message including the information obtained from the client device to the remote peer device, wherein based on the session initiation message, a secured channel is established directly between the remote peer device and the client device and the multimedia data is directly communicated over the secured channel thereby bypassing network transmission of the multimedia data to the virtual desktop;

wherein the session initiation message is a Session Description Protocol (SDP) offer, and wherein the remote peer responds with an SDP answer; and wherein the session initiation message is intercepted by a browser extension on the web browser on the virtual desktop, the browser extension configured to request the information from the client device and override the session initiation message with the information obtained from the client device and forward the session initiation message to the WebRTC application.

2. The method of claim 1, further comprising:
overriding the SDP offer and the SDP answer with Interactive Connectivity Establishment (ICE) candidates, a fingerprint for Datagram Transport Layer Security (DTLS) handshake and capabilities from the client device.

3. The method of claim 1, wherein the browser extension is configured to intercept calls between the WebRTC application and WebRTC framework of the browser by overriding WebRTC peer connection application programming interfaces (APIs) to establish the secured channel between the client device and the remote peer device.

4. The method of claim 1, wherein the browser extension employs a native messaging host application that runs as a process on the virtual desktop and communicates with the browser extension using standard input (STDIN) and standard output (STDOUT) streams.

5. The method of claim 1, wherein the client device includes a media client plugin having access to a camera and one or more audio devices of the client device, wherein the media client plugin is configured to handle encoding of audio and video captured on the client device before transmitting the audio and video to the remote peer device.

6. A computing device, comprising:
at least one processor; and
memory including instructions that, when executed by the at least one processor, cause the computing device to perform the steps of:
establishing a virtual desktop session between a client device and a virtual desktop hosted on a server over a network connection;
receiving a request to launch a web real-time communication (WebRTC) application on a web browser operating on the virtual desktop, wherein the WebRTC application is configured to communicate multimedia data with a remote peer device;
intercepting a session initiation message sent from the WebRTC application;
overriding the session initiation message by replacing at least a portion of content of the session initiation message with information obtained from the client device; and
forwarding the session initiation message including the information obtained from the client device to the remote peer device, wherein based on the session initiation message, a secured channel is established directly between the remote peer device and the client device and the multimedia data is directly communicated over the secured channel thereby bypassing network transmission of the multimedia data to the virtual desktop;
wherein the session initiation message is a Session Description Protocol (SDP) offer, and wherein the remote peer responds with an SDP answer; and
wherein the session initiation message is intercepted by a browser extension on the web browser on the virtual desktop, the browser extension configured to request the information from the client device and override the session initiation message with the information obtained from the client device and forward the session initiation message to the WebRTC application.

7. The computing device of claim 6, wherein the memory further includes instructions that, when executed by the at least one processor, cause the computing device to perform the steps of:
overriding the SDP offer and the SDP answer with Interactive Connectivity Establishment (ICE) candidates, a fingerprint for Datagram Transport Layer Security (DTLS) handshake and capabilities from the client device.

8. The computing device of claim 6, wherein the browser extension is configured to intercept calls between the WebRTC application and WebRTC framework of the browser by overriding WebRTC peer connection application programming interfaces (APIs) to establish the secured channel between the client device and the remote peer device.

9. The computing device of claim 6, wherein the client device includes a media client plugin having access to a camera and one or more audio devices of the client device, wherein the media client plugin is configured to handle encoding of audio and video captured on the client device before transmitting the audio and video to the remote peer device.

10. A non-transitory computer readable storage medium comprising one or more sequences of instructions, the instructions when executed by one or more processors causing the one or more processors to execute the operations of:
establishing a virtual desktop session between a client device and a virtual desktop hosted on a server over a network connection;
receiving a request to launch a web real-time communication (WebRTC) application on a web browser operating on the virtual desktop, wherein the WebRTC application is configured to communicate multimedia data with a remote peer device;
intercepting a session initiation message sent from the WebRTC application;
overriding the session initiation message by replacing at least a portion of content of the session initiation message with information obtained from the client device; and forwarding the session initiation message including the information obtained from the client device to the remote peer device, wherein based on the session initiation message, a secured channel is established directly between the remote peer device and the client device and the multimedia data is directly communicated over the secured channel thereby bypassing network transmission of the multimedia data to the virtual desktop;

wherein the session initiation message is a Session Description Protocol (SDP) offer, and wherein the remote peer responds with an SDP answer; and wherein the session initiation message is intercepted by a browser extension on the web browser on the virtual desktop, the browser extension configured to request the information from the client device and override the session initiation message with the information obtained from the client device and forward the session initiation message to the WebRTC application.

11. The non-transitory computer readable storage medium of claim 10, further comprising instructions which when executed by one or more processors cause the one or more processors to execute the operations of:

overriding the SDP offer and the SDP answer with Interactive Connectivity Establishment (ICE) candidates, a fingerprint for Datagram Transport Layer Security (DTLS) handshake and capabilities from the client device.

12. The non-transitory computer readable storage medium of claim 10, wherein the browser extension is configured to intercept calls between the WebRTC application and WebRTC framework of the browser by overriding WebRTC peer connection application programming interfaces (APIs) to establish the secured channel between the client device and the remote peer device.

13. The non-transitory computer readable storage medium of claim 10, wherein the browser extension employs a native messaging host application that runs as a process on the virtual desktop and communicates with the browser extension using standard input (STDIN) and standard output (STDOUT) streams.

14. The non-transitory computer readable storage medium of claim 10, wherein the client device includes a media client plugin having access to a camera and one or more audio devices of the client device, wherein the media client plugin is configured to handle encoding of audio and video captured on the client device before transmitting the audio and video to the remote peer device.

* * * * *